(12) United States Patent
Badouin

(10) Patent No.: US 9,866,665 B2
(45) Date of Patent: Jan. 9, 2018

(54) METHOD FOR OPERATING A COMMUNICATION SYSTEM, AND COMMUNICATION SYSTEM

(71) Applicant: Audi AG, Ingolstadt (DE)

(72) Inventor: David Alexander Badouin, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/523,196

(22) PCT Filed: Oct. 13, 2015

(86) PCT No.: PCT/EP2015/002002
§ 371 (c)(1),
(2) Date: Apr. 28, 2017

(87) PCT Pub. No.: WO2016/066245
PCT Pub. Date: May 6, 2016

(65) Prior Publication Data
US 2017/0324854 A1    Nov. 9, 2017

(30) Foreign Application Priority Data
Oct. 31, 2014    (DE) .......................... 10 2014 016 223

(51) Int. Cl.
*H04M 1/00*       (2006.01)
*H04M 1/60*       (2006.01)
(Continued)

(52) U.S. Cl.
CPC ....... *H04M 1/6091* (2013.01); *B60R 11/0241* (2013.01); *H04B 1/38* (2013.01);
(Continued)

(58) Field of Classification Search
CPC .... H04M 1/6091; H04M 1/6083; H04B 1/23; H04B 5/0031; H04W 88/02
(Continued)

(56) References Cited

U.S. PATENT DOCUMENTS 5,844,987 A  * 12/1998  Matthews ............. B60R 25/102
                                                                    340/901
8,073,590 B1 * 12/2011  Zilka ................... H04M 1/6083
                                                                    340/572.3
(Continued)

*Primary Examiner* — April G Gonzales
(74) *Attorney, Agent, or Firm* — Sterne, Kessler, Goldstein & Fox P.L.L.C.

(57) ABSTRACT

The invention relates to a method for operating a communication system, comprising the steps: Providing a chip card, in particular a SIM card, in a communication device of a motor vehicle, said chip card including a user identification for dialing into at least one mobile communication network; storing a device identification of a mobile phone in the communication device of the motor vehicle; establishing a mobile communication link between the mobile phone and the communication device of the motor vehicle using the user identification stored on the chip card if a predetermined activation action has been detected on the mobile phone and it has been determined that the device identification of the mobile phone is stored in the communication device of the motor vehicle. The invention furthermore relates to a communication system.

6 Claims, 1 Drawing Sheet

(51) Int. Cl.
*H04B 5/00* (2006.01)
*B60R 11/02* (2006.01)
*H04W 88/02* (2009.01)
*H04B 1/38* (2015.01)

(52) U.S. Cl.
CPC ........ *H04B 5/0031* (2013.01); *H04M 1/6083* (2013.01); *H04W 88/02* (2013.01); *G08C 2201/93* (2013.01)

(58) Field of Classification Search
USPC ...................................... 455/575.9
See application file for complete search history.

(56) References Cited

U.S. PATENT DOCUMENTS

| | | | | |
|---|---|---|---|---|
| 8,078,397 | B1* | 12/2011 | Zilka | G01C 21/362 340/988 |
| 8,190,692 | B1* | 5/2012 | Zilka | H04L 12/6418 709/203 |
| 8,781,442 | B1* | 7/2014 | Link, II | G08G 1/205 370/338 |
| 9,167,395 | B2* | 10/2015 | Takeda | H04W 4/14 |
| 9,367,968 | B2* | 6/2016 | Giraud | G07C 5/008 |
| 2003/0224840 | A1* | 12/2003 | Frank | G01C 21/26 455/575.9 |
| 2006/0052140 | A1* | 3/2006 | Hicks, III | H04L 63/0853 455/569.1 |
| 2007/0287439 | A1* | 12/2007 | Weyl | G06F 8/65 455/420 |
| 2009/0061951 | A1* | 3/2009 | Giese | H04M 1/6083 455/569.2 |
| 2011/0230169 | A1* | 9/2011 | Ohki | G01C 21/362 455/412.1 |
| 2015/0045090 | A1* | 2/2015 | Morrissey | H04W 88/06 455/552.1 |
| 2016/0021193 | A1* | 1/2016 | Fischer | H04L 67/2823 709/224 |

* cited by examiner

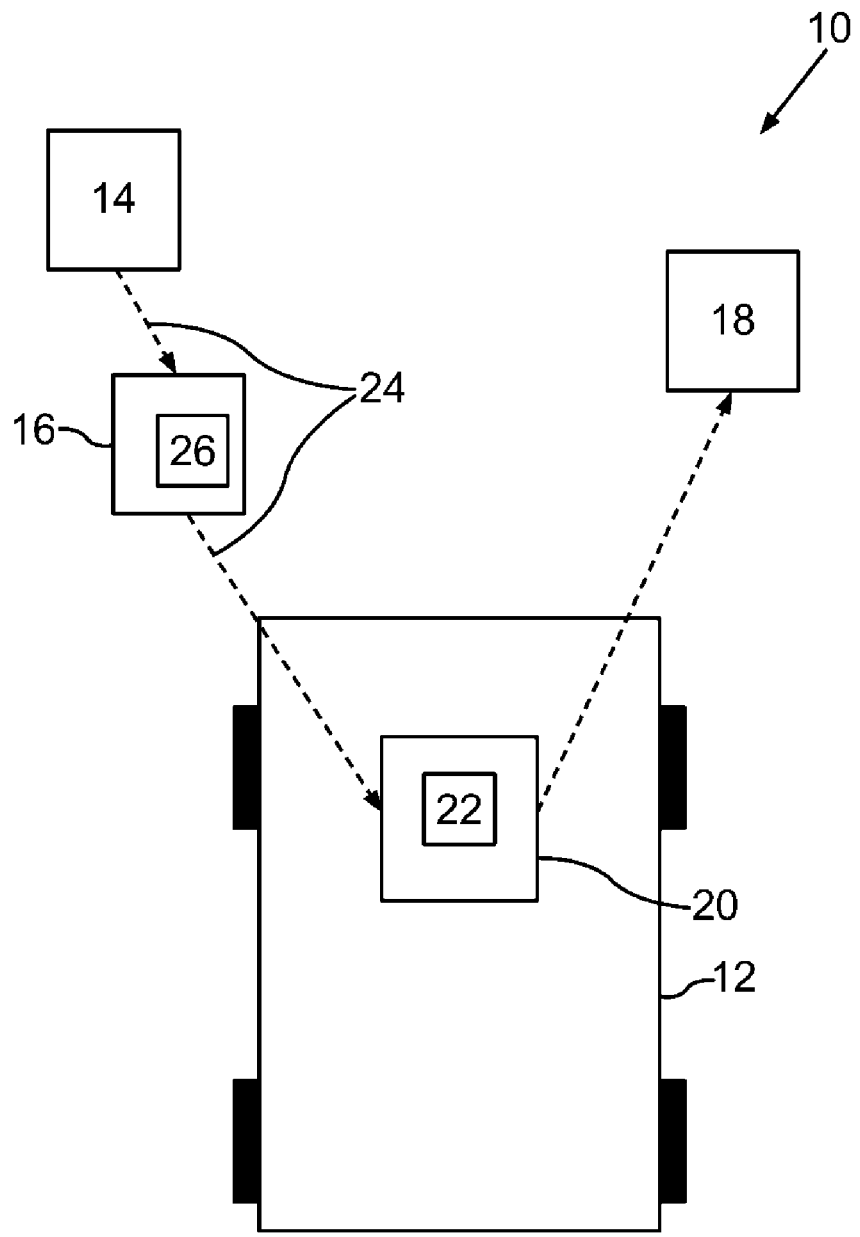

METHOD FOR OPERATING A COMMUNICATION SYSTEM, AND COMMUNICATION SYSTEM

TECHNICAL FIELD

The invention relates to a method for operating a communication system and to a communication system.

BACKGROUND

DE 10 2012 022 701 A1 shows a communication system with a mobile phone module for a vehicle comprising a storage device for storing a participant identity required for access to a telecommunication network. The mobile phone module is configured to communicate during operation via a communication device using a participant identity stored in the storage device with a mobile phone wirelessly such that data stored in the mobile phone can be transferred to the mobile phone module.

DE 10 2009 012 628 A1 shows an arrangement for transmitting an emergency call from a vehicle. As soon as an accident occurs with the vehicle, an emergency call is sent to an emergency call center.

DE 10 2009 058 097 A1 describes a method for establishing a communication link for using a telematics service in a vehicle. In doing so, a voice connection between the vehicle and an agency providing the telematics service is established based on a protocol for setting up a call for a packet-switching voice transmission.

US 2008/0272910 A1 shows a method for operating a security system of a motor vehicle. Using his mobile phone, a vehicle owner can send an information query to a communication device installed in his motor vehicle when the vehicle owner is not in the motor vehicle. The information query is then only processed using the security system if authentication information sent by means of the mobile phone to the security system matches authentication information stored on the part of the security system. In the context of the information query remote-controlled by the vehicle owner via his mobile phone, it is also mentioned that the vehicle owner could also wish to talk to a driver of his motor vehicle.

DE 102 38 805 A1 shows a device for automatically generating an emergency call in road traffic. After an accident of a motor vehicle has been detected, the emergency call to a rescue service is sent by means of a mobile communication device arranged in the motor vehicle.

SUMMARY

It is the task of the present invention to provide a possibility for a vehicle owner to particularly easily and reliably reach a driver of his own motor vehicle.

This task is achieved by a method for operating a communication system as well as by a communication system having the features of the independent claims. Advantageous embodiments comprising useful and non-trivial further developments of the invention are specified in the dependent claims.

In the method according to the invention for operating a communication system, a chip card, in particular a SIM card, is provided in a communication device of a motor vehicle, said chip card including a user identification for dialing into at least one mobile communication network. A device identification of a mobile phone is also stored in the communication device of the motor vehicle. A mobile communication link between the mobile phone and the communication device of the motor vehicle using the user identification stored on the chip card is furthermore established if a predetermined activation action has been detected on the mobile phone and it has been determined that the device identification of the mobile phone is stored in the communication device of the motor vehicle. The mobile phone is preferably a smartphone unambiguously assigned to the owner or main user of the motor vehicle. This unambiguous assignment to the owner or main user of the motor vehicle takes place according to the invention by storing the device identification of the respective mobile phone, i.e. preferably the smartphone, in the communication device of the motor vehicle. The device identification is preferably a so-called international mobile station equipment identity referred to as IMEI for short. This identity is a unique fifteen-digit serial number, based on which any GSM or UMTS end device can theoretically be identified unambiguously.

In other words, the invention provides that an exclusive mobile communication link is established between the mobile phone and the communication device of the motor vehicle if it has been determined that the device identification of the respective mobile phone is stored in the communication device of the motor vehicle. The owner or the main user of the motor vehicle has thus always the possibility of contacting the person currently using his motor vehicle with or without authorization.

The invention also provides that a voice connection is automatically established between the mobile phone and the communication device as soon as the mobile communication link has been established for a predetermined period of time. For example, after three rings, the mobile phone is automatically put through to the motor vehicle, i.e. the voice connection is established, so that the user of the mobile phone can communicate directly with the respective driver of the motor vehicle. In other words, the driver does not have any choice as to whether he wants to allow the voice connection, i.e. the putting through of the telephone call by means of the mobile phone, or not. This can in particular be advantageous if the motor vehicle has been stolen and the owner of the motor vehicle wants to contact the driver who has taken the motor vehicle.

The invention furthermore provides that the established voice connection is only terminated if an appropriate termination action has been detected on the mobile phone. In other words, a driver of the motor vehicle cannot himself terminate the voice connection, i.e. the call, between the mobile phone and the motor vehicle. This is in particular advantageous again if the motor vehicle has been stolen, for example.

An advantageous embodiment of the invention provides that on the mobile phone is installed an application, by means of which the establishing of the mobile communication link between the mobile phone and the communication device is initiated as soon as a predefined user input has been detected via the application. In other words, an exclusive voice call can be initiated via a so-called app installed on the respective mobile phone. For example, by means of the app, an operating element is displayed by means of the touch screen of the mobile phone, where the establishing of the mobile communication link between the mobile phone and the communication device is initiated as soon as this operating element is activated. An owner or main user of the motor vehicle can thereby particularly easily establish said exclusive mobile communication link between his own mobile phone and the motor vehicle.

Another advantageous embodiment of the invention provides that a respective acoustic signal is output by means of the mobile phone and the communication device as soon as the mobile communication link has been established. For example, a ring tone is output by means of the mobile phone, said ring tone indicating that the motor vehicle is currently being called by means of the mobile phone. By means of the communication device, a ring tone is, for example, output, which signals the driver of the motor vehicle that an attempt is currently being made to put a voice call through.

An alternative advantageous embodiment of the invention provides that a voice connection between the mobile phone and the communication device is only established if an acceptance of the voice connection has been confirmed on the part of the vehicle. It can also be provided in this context that a termination of the previously established voice connection can be terminated at least on the part of the motor vehicle as well, in particular by an appropriate operation action of the driver of the motor vehicle. It can, for example, be provided that the possibility is provided in the previously mentioned application to differentiate whether the voice connection between the mobile phone [and] the communication device can be terminated on the part of the vehicle as well or exclusively on the part of the mobile phone. It can likewise be provided that it can be determined by means of said application whether the voice connection is to be established automatically or whether the voice connection is not established until an acceptance of the voice connection has been confirmed on the part of the motor vehicle. A user of the mobile phone can thereby easily determine what type of voice connection he would like to establish.

Another advantageous embodiment of the invention provides that the mobile communication link between the mobile phone and the communication device is established via a server. For example, the comparison as to whether the device identification of the mobile phone is stored in the communication device of the motor vehicle at all and the user of the mobile phone is thus authorized at all to perform said exclusive voice call can also take place via the server. In addition, the storing of the device identification of the mobile phone in the communication device of the motor vehicle can, for example, also take place via the server, i.e. by means of the server.

Another advantageous embodiment of the invention provides that, if a mobile communication link between the mobile phone and the communication device cannot be established, an audio recorder is activated and a message recorded by means of said audio recorder is transmitted to the communication device as soon as a mobile communication link can be established between the audio recorder and the communication device. This can, for example, be the case if the ignition of the motor vehicle is deactivated, i.e. if, for example, a condition "Terminal 15 off" exists. By recording the message and the resulting possibility of playing the message as soon as the motor vehicle is activated again, the user of the mobile phone would have an additional memo function in order to reach a driver of the motor vehicle.

The communication system according to the invention comprises a motor vehicle, a mobile phone, a communication device integrated into the motor vehicle and designed to store a device identification of the mobile phone. The communication system furthermore comprises a chip card, in particular a SIM card, with a user identification for a mobile communication network, said chip card being accommodated in the communication device. The communication system is designed to establish a mobile communication link between the mobile phone and the communication device of the motor vehicle using the user identification stored on the chip card only if a predetermined activation action has been detected on the mobile phone and it has been determined that the device identification of the mobile phone is stored in the communication device. The communication system is additionally designed to automatically establish a voice connection between the mobile phone and the communication device as soon as the mobile communication link has been established for a predetermined period of time and to terminate the established voice connection only if an appropriate termination action has been detected on the mobile phone so that a driver of the motor vehicle cannot himself terminate the voice connection. Advantageous embodiments of the method according to the invention are to be regarded as advantageous embodiments of the communication system, wherein the communication system comprises in particular means for performing the method steps.

An advantageous embodiment of the communication system provides that the communication device is designed to automatically report a traffic accident of the motor vehicle via the mobile communication network to an emergency call center. In other words, the communication device has a double functionality, namely on the one hand to allow the previously described exclusive voice call and on the other hand to at the same time provide an automatic emergency call function.

Further advantages, features, and details of the invention arise from the following description of advantageous exemplary embodiments, as well as with reference to the drawing. The features and feature combinations mentioned above in the description, as well as the features and feature combinations mentioned below in the FIGURE description and/or shown only in the single FIGURE, can be used not only in the specified combination but also in other combinations or alone without leaving the scope of the invention.

BRIEF DESCRIPTION OF THE DRAWING/FIGURE

The accompanying drawing, is incorporated herein and form a part of the specification, illustrate the embodiments of the present disclosure and, together with the description, further serve to explain the principles of the embodiments and to enable a person skilled in the pertinent art to make and use the embodiments.

The drawing shows in the single FIGURE (FIG. 1) a schematic representation of a communication system comprising a motor vehicle, a mobile phone, and an emergency call center.

DETAILED DESCRIPTION

A communication system denoted overall by 10 comprises a motor vehicle 12, a mobile phone 14, a server 16, and an emergency call center 18. The motor vehicle 12 comprises a communication device 20 integrated into said motor vehicle, which communication device is designed to store a device identification of the mobile phone 14. In the communication device 20 is accommodated a chip card 22, which in the present case is a SIM card with an appropriate user identification for a mobile communication network.

The communication system 10 is designed to establish a mobile communication link 24 between the mobile phone 14 and the communication device 20 using the user identification stored on the chip card 22 only if a predetermined activation action has been detected on the mobile phone 14 and it has been determined that the device identification of the mobile phone 14 is indeed stored in the communication device 20. The device identification of the mobile phone 14 is preferably a so-called international mobile station equipment identity referred to as IMEI for short.

The communication device 20 is additionally designed to automatically report a traffic accident of the motor vehicle 12 via the mobile communication network to the emergency call center 18, which can also take place using the user identification stored on the chip card 22.

A method for operating the communication system 10 is explained in more detail below. First, the chip card 22 is provided in the communication device 20 of the motor vehicle 12, wherein the chip card 22 includes a user identification for dialing into at least one mobile communication network. The device identification of the mobile phone 14 is furthermore stored in the communication device 20. On the mobile phone 14 can be installed an application, a so-called app for short, via which the IMEI, for example, is queried, forwarded to the server 16, and forwarded again by the server 16 to the communication device 20, whereupon the IMEI is then stored in the communication device 20. Alternatively or additionally, it can, for example, also be provided that the motor vehicle 12 has an appropriate user interface with an appropriate graphic user interface, via which the IMEI of another unambiguous device identification of the mobile phone 14 can be inputted so that said device identification is stored in the communication device 20.

By means of said app, the possibility is provided to establish the mobile communication link 24 between the mobile phone 14 and the communication device 20. It is, for example, brought about via the app that a virtual button is displayed on a touch display device of the mobile phone 14. As soon as a user presses this virtual button, the mobile communication link 24 between the mobile phone 14 and the communication device 20 is established via the server 16 using the user identification stored on the chip card 22 if the device identification of the mobile phone 14 matches the device identification stored in the communication device 20 of the motor vehicle 12.

As soon as the mobile communication link 24 has been established, it rings within the motor vehicle 12 so that a driver is sent a signal that it is currently being attempted to put a call through. At the same time, an acoustic signal is output by means of the mobile phone 14, said signal notifying a user of the mobile phone 14 that the mobile communication link 24 as such has already been established and the motor vehicle 12 is currently being called.

According to a first alternative, it can be provided in the process that a voice connection between the mobile phone 14 and the communication device 20 is automatically established as soon as the mobile communication link 24 has been established for a predetermined period of time, for example if it has rung three times. A driver of the motor vehicle 12 thus does not have the possibility of refusing the incoming call; the call is automatically put through instead. In this context, it can also be provided that the established voice connection, i.e. the call put through, is only terminated if an appropriate termination action has been detected on the mobile phone 14, for example via said app again. The user of the mobile phone 14 can thus very easily force the putting through of his call. This may, for example, be advantageous if the motor vehicle 12 has been stolen and the user of the mobile phone 14 would like to be put through to the unlawful taker of the motor vehicle 12. It is, for example, also conceivable that a child of the user of the mobile phone 14 is on the road with the motor vehicle 12 and is late. In this case, it can also be advantageous if the user of the mobile phone 14 can force a putting through of the voice call.

According to a second alternative, it can also be provided that a voice connection between the mobile phone 14 and the communication device 20 is only established if an acceptance of the voice connection has been confirmed on the part of the vehicle. The app installed on the mobile phone 14 is preferably designed such that the user of the mobile phone 14 can choose which type of voice call he would like, i.e. whether he wants a forced voice call or a traditional voice call.

If the variant is chosen that the voice connection between the mobile phone 14 and the communication device 20 is only established if an acceptance of the voice connection has been confirmed on the part of the vehicle, it is preferably also provided that the voice connection can be terminated both on the part of the mobile phone and on the part of the vehicle.

Situations can also arise, in which the mobile communication link 24 between the mobile phone 14 and the communication device 20 cannot be established, for example because a condition "Terminal 15 off" exists or because the motor vehicle 12 is currently in a dead zone. In the case that the mobile communication link 24 cannot be established, an audio recorder 26 integrated in the present case into the server 16 is activated and a message recorded by said audio recorder is transmitted to the communication device 20 as soon as the mobile communication link 24 can be established between the audio recorder 26 and the communication device 20, i.e. between the server 16 and the communication device 20. In other words, the recorded message is then put through to the motor vehicle 12 as soon as the mobile communication link 24 can be established by means of the server 16.

In this respect, there can, for example, also be two alternatives. The first alternative would be such that the recorded message is automatically transmitted to the communication device 20 and output by means of the motor vehicle 12 without a driver of the motor vehicle 12 being able to prevent it. According to a second alternative, it can however also be provided that it is, for example, only indicated to a driver of the motor vehicle 12 by means of an optical or acoustic signal that a recorded message has been received, wherein said message is only played if a confirmation on the part of the vehicle, in particular on the part of the driver, has been detected.

The invention claimed is:

1. A method for operating a communication system, the method comprising:
   providing a chip card in a communication device of a motor vehicle, wherein the chip card is a SIM card and wherein the chip card comprises a user identification for dialing into at least one mobile communication network;
   storing a device identification of a mobile phone in the communication device of the motor vehicle;
   establishing a mobile communication link between the mobile phone and the communication device of the motor vehicle using the user identification stored on the chip card when it is determined that (i) a predetermined activation action has been detected on the mobile phone and (ii) the device identification of the mobile phone is stored in the communication device of the motor vehicle;
   establishing, automatically, a voice connection between the mobile phone and the communication device when the mobile communication link has been established for a predetermined period of time, wherein the established voice connection is only terminated if an appropriate termination action has been detected on the mobile phone so a driver of the motor vehicle cannot terminate the established voice connection, and wherein if the mobile communication link cannot be established between the mobile phone and the communication device, an audio recorder is activated to record a message, the recorded message is transmitted to the communication device and output at the motor vehicle when the mobile communication link between the audio recorder and the communication device is to be established.

2. The method of claim 1, wherein the mobile communication link between the mobile phone and the communication device is initiated in response to a detected user input on an application installed on the mobile phone.

3. The method of claim 1, wherein an acoustic signal is output by the mobile phone and the communication device when the mobile communication link has been established.

4. The method of claim 1, wherein the mobile communication link between the mobile phone and the communication device is established via a server.

5. A communication system comprising:
a motor vehicle;
a mobile phone comprising a device identification;
a communication device integrated into the motor vehicle and configured to store the device identification of the mobile phone;
a chip card comprising a user identification for a mobile communication network, wherein the chip card is a SIM card and wherein the chip card is at least partially contained in the communication device;

wherein the communication system is configured to establish a mobile communication link between the mobile phone and the communication device using the user identification stored on the chip card when it is determined that (i) a predetermined activation action has been detected on the mobile phone and (ii) the device identification of the mobile phone is stored in the communication device;

wherein the communication system is further configured to automatically establish a voice connection between the mobile phone and the communication device when the mobile communication link has been established for a predetermined period of time, wherein the established voice connection is terminated when an appropriate termination action has been detected on the mobile phone so a driver of the motor vehicle cannot terminate the established voice connection, and wherein, when the mobile communication link cannot be established between the mobile phone and the communication device, the communication system is further configured to:
activate an audio recorder to record a message,
transmit the recorded message to the communication device, and
output the recorded messages at the motor vehicle when the mobile communication link between the audio recorder and the communication device is established.

6. The communication system of claim 5, wherein the communication device is configured to automatically report a traffic accident of the motor vehicle to an emergency call center via the mobile communication network.

* * * * *